United States Patent
Large et al.

(10) Patent No.: US 11,508,393 B2
(45) Date of Patent: Nov. 22, 2022

(54) CONTROLLER FOR REAL-TIME VISUAL DISPLAY OF MUSIC

(71) Applicant: Oscilloscape, LLC, East Hartford, CT (US)

(72) Inventors: Edward W. Large, East Hartford, CT (US); Ji Chul Kim, East Hartford, CT (US)

(73) Assignee: Oscilloscape, LLC, East Hartford, CT (US)

( * ) Notice: Subject to any disclaimer, the term of this patent is extended or adjusted under 35 U.S.C. 154(b) by 677 days.

(21) Appl. No.: 16/437,710

(22) Filed: Jun. 11, 2019

(65) Prior Publication Data
US 2020/0105292 A1    Apr. 2, 2020

Related U.S. Application Data

(60) Provisional application No. 62/684,055, filed on Jun. 12, 2018.

(51) Int. Cl.
*G10L 25/57* (2013.01)
*G10L 25/30* (2013.01)
(Continued)

(52) U.S. Cl.
CPC .............. *G10L 25/30* (2013.01); *A63J 17/00* (2013.01); *G06N 3/04* (2013.01); *G10L 25/51* (2013.01); *A63J 5/02* (2013.01); *G06N 3/08* (2013.01); *G10H 2210/066* (2013.01); *G10H 2210/071* (2013.01)

(58) Field of Classification Search
CPC ........ G06T 13/205; G06T 13/40; G10L 21/14
See application file for complete search history.

(56) References Cited

U.S. PATENT DOCUMENTS 6,177,623 B1 *  1/2001  Ooseki ..................... G10H 1/40
                                                        84/610
6,225,545 B1 *  5/2001  Suzuki ................. G09B 15/023
                                                       84/464 R
(Continued)

FOREIGN PATENT DOCUMENTS

CN          108305604 A   *   7/2018   ........... G10H 1/0016

OTHER PUBLICATIONS

Chapin, H., Jantzen, K. J., Kelso, J. A. S., Steinberg, F., & Large, E. W. (2010). Dynamic emotional and neural responses to music depend on performance expression and listener experience. PLoS One, 5(12), e13812.
(Continued)

*Primary Examiner* — Daniel Abebe
(74) *Attorney, Agent, or Firm* — Howard M. Gitten, Esq.; Lewis Brisbois Bisgaard & Smith LLP

(57) ABSTRACT

A controller for real-time visual display of music includes a music analysis module and a display control module. The music analysis module receives an audio input, determines human perceived musical structures, human felt affect and emotion as a function of the audio input, and outputs a signal corresponding to the determined structure, affect and emotion. The display control module is operatively coupled to the music analysis module and receives the signal and controls a visual display as a function thereof to express the determined musical structure, affect and emotion in a visual manner.

7 Claims, 3 Drawing Sheets

(51) Int. Cl.
  *G10L 25/51* (2013.01)
  *G06N 3/04* (2006.01)
  *A63J 17/00* (2006.01)
  *A63J 5/02* (2006.01)
  *G06N 3/08* (2006.01)

(56) References Cited

U.S. PATENT DOCUMENTS

| | | | | |
|---|---|---|---|---|
| 7,116,328 | B2* | 10/2006 | Kawai | G06T 13/205 |
| | | | | 84/2 |
| 7,376,562 | B2 | 5/2008 | Large | |
| 7,601,904 | B2* | 10/2009 | Dreyfuss | G09B 15/00 |
| | | | | 84/600 |
| 8,583,442 | B2 | 11/2013 | Large | |
| 8,706,274 | B2* | 4/2014 | Kobayashi | G06T 13/205 |
| | | | | 700/94 |
| 8,930,292 | B2 | 1/2015 | Large | |
| 10,325,627 | B2* | 6/2019 | Ikeda | H04N 5/91 |
| 2012/0259634 | A1* | 10/2012 | Tsunokawa | G06F 16/433 |
| | | | | 704/235 |
| 2015/0155006 | A1* | 6/2015 | Chou | G11B 27/031 |
| | | | | 386/230 |
| 2021/0249032 | A1* | 8/2021 | Smith | G10L 21/14 |

OTHER PUBLICATIONS

Egulluz, V. M., Ospeck, M., Choe, Y., Hudspeth, A. J., & Magnasco, M. O. (2000). Essential Nonlinearities in Hearing. Physical Review Letters, 84(22), 5232.

Humphrey, E. J., Bello, J. P., & LeCun, Y. (2013). Feature learning and deep architectures: new directions for music informatics. [10.1109/MMUL.2011.34]. Journal of Intelligent Information Systems, 41(3), 461-481. doi: papers2:// publication/doi/ 10.1109/MMUL.2011.34.

Isbilen, E. S., & Krumhansl, C. L. (2016). The color of music: Emotion-mediated associations to Bach's Well-tempered Clavier. [10.1037/pmu0000147]. Psychomusicology: A Journal of Research in Music Cognition, 26(2), 149-161. doi: papers2://publication/doi/ 10.1037/pmu0000147.

Juslin, P. N. (2000). Cue utilization in communication of emotion in music performance: relating performance to perception. Journal of Experimental Psychology: Human Perception and Performance, 26(6), 1797-1813.

Kim, Y. E., Schmidt, E. M., Migneco. R., Morton, B. G., Richardson, P., Scott, J., . . . Turnbull, D. (2010). Music Emotion Recognition: A State of the Art Review. Paper presented at the 11th International Society for Music Information Retrieval Conference (ISMIR 2010).

Lerud, K. D., Almonte, F. V., Kim, J. C., & Large, E. W. (2014). Mode-locking neurodynamics predict human auditory brainstem responses to musical intervals. Hearing Research. doi: papers2:// publication/doi/ 10.1016/j.heares.2013.09.010.

Lerud, K. L., Kim, J. C., & Large, E. W. (2016). GrFNN Brainstem: An oscillatory model of the auditory periphery and brainstem, from https://github.com/MusicDynamicsLab/GrFNNBrainstem.

Lerud, K. D., Kim, J. C., Almonte, F. V., Carney, L. H., & Large, E. W. (2016b). A canonical oscillator model of cochlear dynamics, 380, 100-107.

Meddis, R. (1986). Simulation of mechanical to neural transduction in the auditory recepter. Journal of the Acoustical Society of America, 79(3), 702-711.

Meddis, R., & O'Mard, L. P. (2006). Virtual pitch in a computational physiological model. The Journal of the Acoustical Society of America, 120(6), 3861-3869. doi: papers2://publication/uuid/ C44D129E-23E4-40ED-86F1-DC65B9494343.

Muller, M., Ellis, D. P. W., Klapuri, A., & Richard, G. (2011). Signal Processing for Music Analysis. [10.1109/ JSTSP.2011.2112333]. IEEE Journal of Selected Topics in Signal Processing, 5(6), 1088-1110.

Palmer, S. E., Langlois, T. A., & Schloss, K. B. (2016). Music-to-Color Associations of Single-Line Piano Melodies in Non-synesthetes. Multisensory research, 29(1-3), 157-193.

Palmer, S. E., Schloss, K. B., Xu, Z., & Prado-León, L. R. (2013). Music-color associations are mediated by emotion. [10.1073/pnas. 1212562110]. Proceedings of the National Academy of Sciences USA, 110(22), 8836-8841.

Zilany, M. S., & Bruce, I. C. (2006). Modeling auditory-nerve responses for high sound pressure levels in the normal and impaired auditory periphery. Journal of the Acoustical Society of America, 120(3), 1446.

Humphrey, E. J., Bello, J. P., & LeCun, Y. (2013). Feature learning and deep architectures: new directions for music informatics. Journal of Intelligent Information Systems, 41(3), 461-481. doi: 10.1007/s10844-013-0248-5.

* cited by examiner

CONTROLLER FOR REAL-TIME VISUAL DISPLAY OF MUSIC

CROSS-REFERENCES TO RELATED APPLICATION

This application claims the benefit of U.S. Provisional Patent Application Ser. No. 62/684,055, filed Jun. 12, 2018, the entireties of which are incorporation by reference herein as if fully set forth.

BACKGROUND OF THE INVENTION

The present invention relates generally to the visual display of music, and more particularly to a device that controls visual display based on automatic inference of perceptual and emotional features of music to which humans are sensitive.

DESCRIPTION OF THE PRIOR ART

Synchronizing visual displays with musical recordings or musical performances is well-known. In the prior art, various types of visual displays are controlled so as to coordinate with music. Examples are 1) simple, inexpensive music reactive LED strips or light panels that respond to sound amplitude in real time linear transformation, and 2) complex lights shows at professional concerts, clubs, or hotels where lights, fireworks, water jets or other displays are choreographed to music in a prearranged pattern, or under human control.

In the prior art, simple lighting controllers react directly to features of sound vibration. These systems may perform linear transformations of sound, such as frequency analysis (e.g., filtering or Fourier analysis), however the mapping of audio signals to light is direct: the lights get brighter as sound gets louder, for example, in some instances in multiple frequency bands (so-called color organs). Alternatively, complex lights shows at professional venues typically require that each show is custom-programmed in advance (e.g., using a DMX controller), requiring sophisticated programming to respond to specific musical pieces, and this may include input that is generated from onstage musical controllers. Light shows at professional venues may also include real-time control by a human lighting designer who is able to respond to perceived musical structures, feelings and emotions. The latter options are expensive and labor intensive.

For certain effects of light/music interplay, real-time control by a human is required so that visualizations can respond to perceived musical structures, feelings, and emotions. Such an outcome cannot be achieved by direct, linear mappings from sound, because musical structures, feeling and emotions are not simple, linear transformations of sound. Human-perceived musical structures, feelings, and emotional responses are 'inferences' from the audio surface, computed by neural networks in the human brain. Examples include perceiving individual instruments and timbres in a complex musical surface, perceiving the pulse, or basic beat, of a musical rhythm, perceiving the metrical structure of a rhythm, perceiving the pitch of an individual note, perceiving consonance and dissonance of musical intervals, perceiving the harmonic progression a song, perceiving the key of a musical work, and understanding whether the music is happy or sad, energetic or relaxed. While the prior art has developed human control systems, they are limited in the complexity and speed of response, in that they are expensive and labor intensive, and automated devices only react in a linear fashion; unable to truly mimic human response to music in a visual manner.

Therefore, what is needed is a device for visual display of music that is capable of inferring such perceptions that overcomes these shortcomings.

BRIEF SUMMARY OF THE INVENTION

The present invention is directed to a controller having a music analysis module that processes music to infer perceived musical features, musical structures, feelings, and emotions, and a display control module that translates the musical features into visual displays. The music analysis module includes a plurality of artificial intelligence and neural network circuits that can recover musical structures, including but not limited to tonal features such as pitch, consonance/dissonance, harmony, tension/relaxation, tonality, and key, timbral features, such as envelope, onset, attack time, spectral centroid and spectral flux, rhythmic features such as pulse, meter, tempo, rate, and rhythmic pattern, and structural features such as verse, chorus, and song endings. The music analysis module also provides a means for using these structures to determine affect parameters such as arousal (energetic/relaxed) and valence (positive/negative), and emotional responses such as happy, sad, and fearful. The display control module includes a means for driving visual displays, including but not limited to light sources, water jets, pyrotechnics, animated characters, and mechanical devices (e.g., robots), in response to an electrical signal. The music analysis module is operatively coupled with the display control module, and provides signals that encode the musical features that the display control module can use to control the visual display.

DETAILED DESCRIPTION AND BEST MODE OF IMPLEMENTATION

Figure 1:
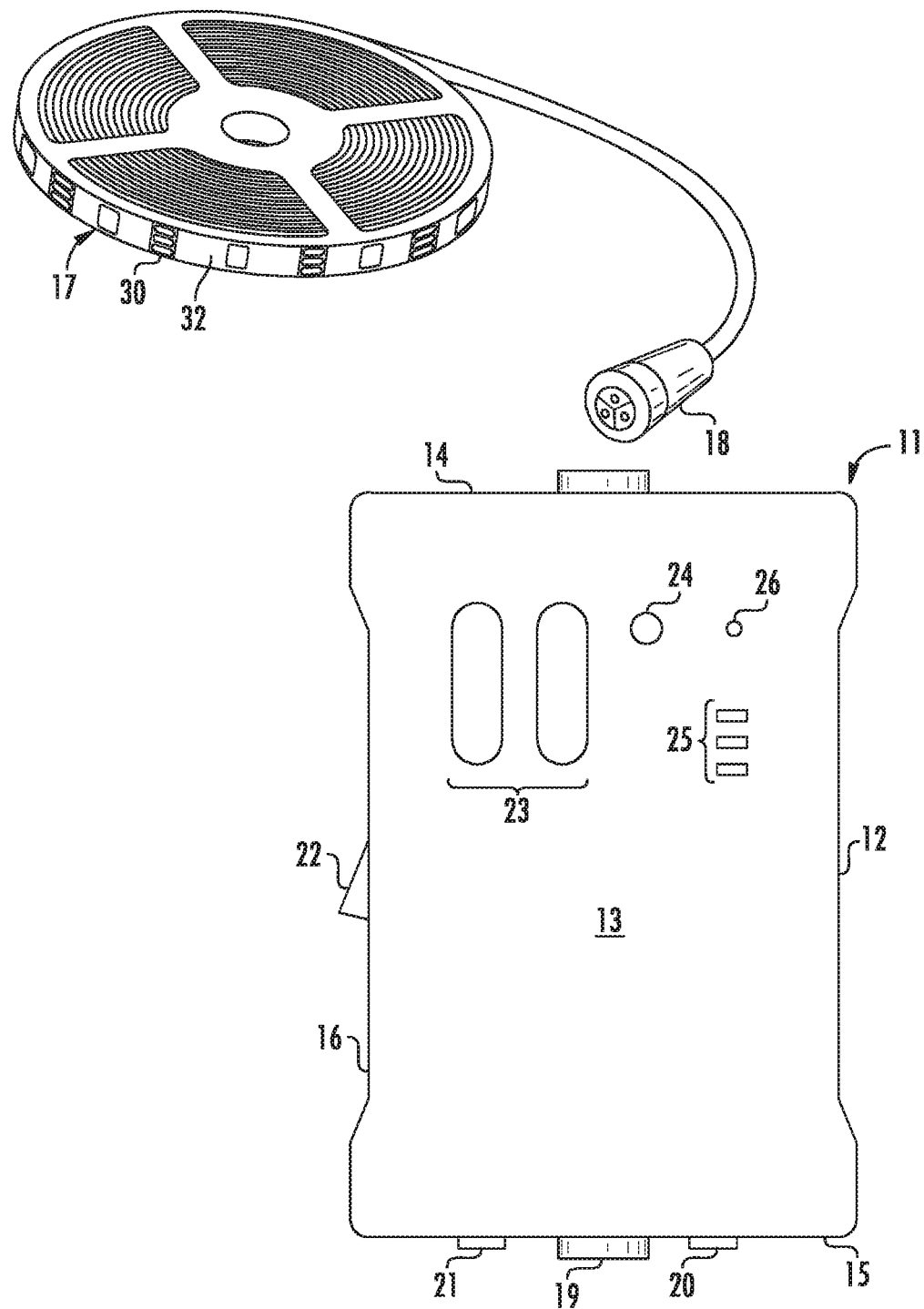
FIG. 1 is a schematic view of a device for control of light displays based on inference of perceptual and emotional features of music constructed in accordance with the invention.

Referring now in detail to the drawings, and initially to FIG. 1, a control device 11 (also "controller") that controls a light display based on automatic inference of perceptual and emotional features of music is shown. As shown, the control device 11 includes a housing 12 having a front surface or face 13, and top 14, bottom 15, and side 16 surfaces. The housing 12 and surfaces 13-16 may be made of any suitable material, such as plastic.

A visual display 17, illustrated by way of non-limiting example as a linear array of LEDs, are connected via a connector 18 to an output (not shown) on the top surface 14 of controller 11. The visual display 17 may comprise a series of 1 to 1000, for example, light emitting diodes (LEDs) 30. The LEDs 30 may be mounted on a strip, string, or panel 32, for example, and are connected to the device. Individually addressable LEDs 30 are preferred as they provide a brilliant light source, can be addressed to create many different visual patterns, and are long-lasting. However, if desired, other light sources may be used. Moreover, other forms of visual display 17 may be controlled, including but not limited to pyrotechnics, water-jets, animated characters, and robots, for example.

Additionally, the bottom face 15 may include a power connector 19 and an audio input jack 20, and USB port 21, and the side face 16 includes an on-off switch 22. The front face includes one or more mode switches 23, one or more system control buttons 24, one or more system status indicators 25, and a microphone 26. The on-off switch 22 will turn the control device 11 on and off. The mode switches 23 are used to select between different modes of response depending upon the listener's choice. For example, one switch may control the type of pattern to be displayed, and the other may control the color palate.

A microphone 26 is provided, in addition to, or instead of, audio input 20, to couple the controller 11 to inputs from any ambient audio source, such as a live musical performance or an audio recording. Other suitable methods of coupling may be used in place of the microphone 26. For example, the audio input 20 on the bottom face 15 may be used to feed audio directly to the controller 11. This signal may originate from a personal mobile device (e.g., a mobile phone or tablet), a DJ sound system, or a musical instrument or mixing board.

Figure 2:
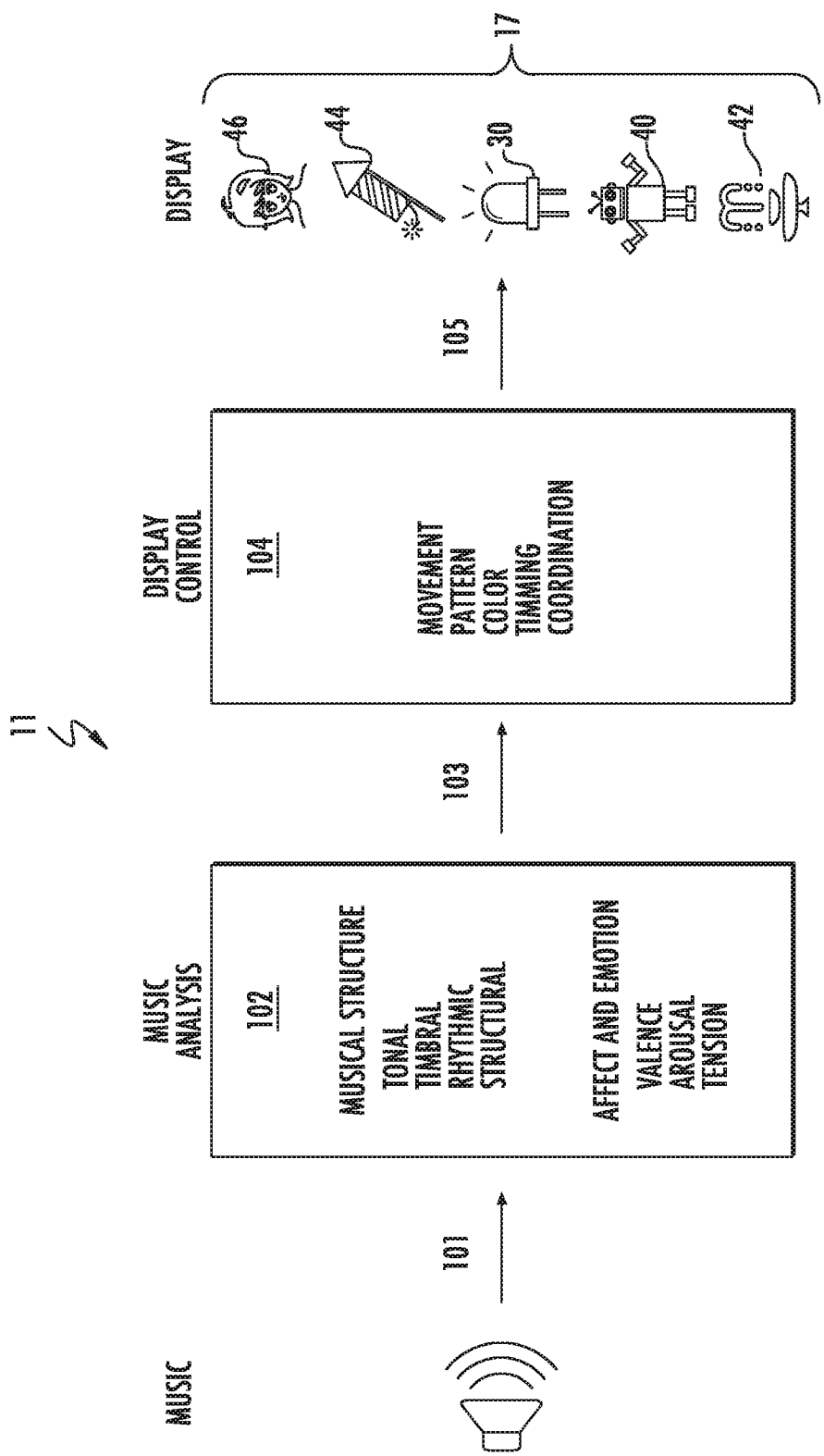
FIG. 2 is a diagram illustrating an artificial intelligence music analysis module for simulating perception of musical structures, feelings, and emotions, and a display control module for controlling visual displays according to the present invention.

Referring now to FIG. 2, a musical signal 101 is provided as input to a music analysis module 102 of controller 11. The music analysis module 102 may consist of a hardware and/or software for computing musical structures, feelings, and emotional interpretations such as perceived by humans when listening to music. The music analysis may take place on an embedded system (e.g., a Raspberry Pi), a mobile device (e.g., a phone or tablet), a personal assistant device (e.g., Echo or Google Home), dedicated lighting hardware (e.g. a DMX controller, or a general purpose computer), whether on-site or in the cloud. Such music analysis algorithms are well-known in the art (e.g., Humphrey, Bello, & LeCun, 2013; Kim et al., 2010; Muller, Ellis, Klapuri, & Richard, 2011), and may include neural networks, nonlinear oscillators, hidden Markov models, pattern matching algorithms, and statistical analyses. Such techniques may further employ learning procedures, such as back-propagation, Hebbian plasticity, and statistical learning techniques; in effect artificial intelligence.

Next, the music analysis is communicated via a connection 103 to the display control module 104. This connection may be via software, a hardware serial bus, or a wireless technology such as Bluetooth or Wi-Fi, for example. The music analysis module provides input to a the display control module 104, which, in response to the signal created by music analysis module 102, computes patterns of light, movement, animated movement, flow, or flight, for example, designed to visually convey and/or amplify perceived musical structures, feelings, and emotions.

Finally, the display control signal is communicated via a connection 105 to a display platform. This connection may be via software, a physical wire or wires, or via a wireless technology such as Bluetooth or Wi-Fi 33, for example. A display platform 106 is provided that is capable of decoding the signals and producing the appropriate visual displays 17. For example, the display might be in the form of patterns of LED light 30, patterns of stage lighting, movement of animated characters 46, movement of robotic mechanical devices 40, launching of fireworks 44, or sprays of water jets 42.

Figure 3:
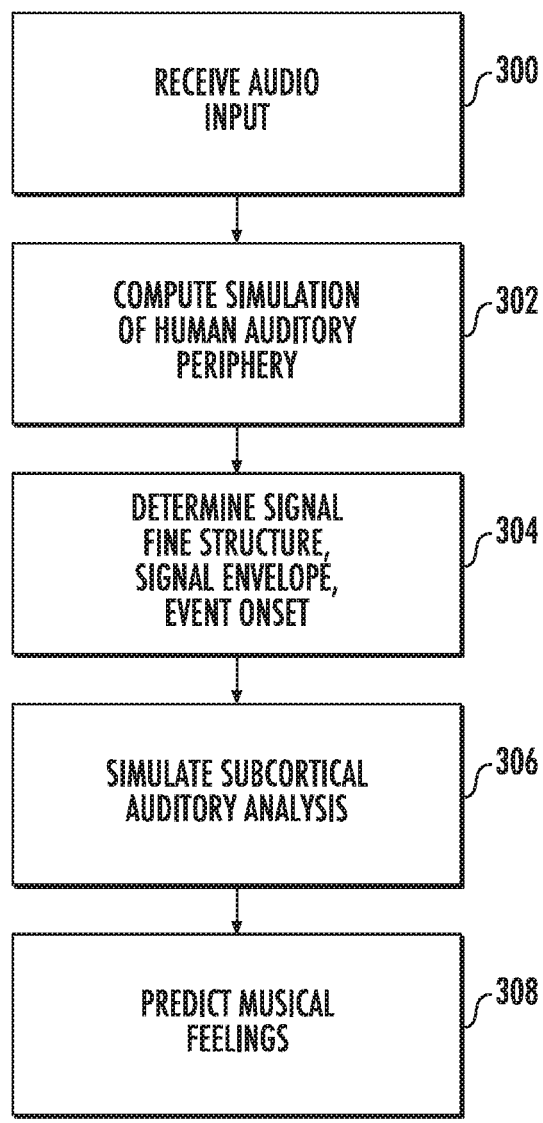
FIG. 3 is a flowchart of operation of the device for control of visual displays in accordance with the invention.

We next reference FIG. 3 in which operation of a preferred embodiment, which is not meant to restrict the scope of the invention, is provided as a concrete example. In the preferred embodiment, a music signal 101 is provided as input in a step 300, via a microphone 26 or an input jack 20, for example, to a music analysis module 102, running on a system-on-a-chip (Allwinner H3). In the initial stage of processing, in a step 302, the music analysis module 102 computes a simulation of the human auditory periphery. This may include for example, simulation of the human middle ear by filtering as well simulation of the human cochlea by nonlinear filtering, using methods which are known in the art (e.g., Bruce, Sachs, & Young, 2003; Eguíluz, Ospeck, Choe, Hudspeth, & Magnasco, 2000; Lerud, Almonte, Kim, & Large, 2014; Lerud, Kim, & Large, 2016b; Zilany & Bruce, 2006).

In a step 304, the signal fine structure, signal envelope, and event onsets, pitch, and timbral features are computed using nonlinear networks that simulate processing in the human auditory nerve, cochlear nucleus, lateral lemniscus, and inferior colliculus. These methods are known in the art and include simulations of individual neurons and small neural populations (see, e.g., Lerud et al., 2014; Lerud, Kim, & Large, 2016a; Meddis, 1986; Meddis & O'Mard, 2006).

These signals are then passed in a step 306 to one or more networks intended to simulate cortical analysis. These networks may include neural oscillator networks (Large patent, 2008), which utilize real-time Hebbian plasticity algorithms (Large patent 2015), and specialized techniques for processing rhythmic features (Large patent 2013). As a whole, the musical structures computed by such the aforementioned simulations of peripheral, subcortical, and cortical neural networks may include, but are not limited to, tonal (e.g., pitch, consonance, harmony, tonality), timbral (e.g., envelope, attack, brightness, spectral flux, instrument identification), rhythmic (e.g., pulse, meter, complexity, rate), and structural (e.g., verse, chorus, song ending) features. In effect, the new combination of such analysis can predict perceived musical features, feeling and emotions.

In a next step 308 of analysis, musical features are used to predict musical feelings (affect) and emotions that are likely to be experienced by humans when listening to the same musical piece. In this step, the structural features are input to a neural network that is trained to reproduce mappings from musical structure to experienced affect and emotion that can be measured in human experiments (Chapin, Jantzen, Kelso, Steinberg, & Large, 2010; Isbilen & Krumhansl, 2016; Juslin, 2000; Kim et al., 2010; Palmer, Langlois, & Schloss, 2016; Palmer, Schloss, Xu, & Prado-León, 2013) These may include arousal (i.e., relaxed/excited), valence (i.e., positive/negative), and emotion categories (e.g., happiness, sadness, fear), for example.

Finally, as a e result of the inventive structure and processing computation of musical structures, feelings, and emotions now takes place in real-time and is predictive, so that visual display can be synchronized and coordinated with the music.

Without human intervention, and in a more complex manner, in a step 310, the output 103 of music analysis module 102 is output as encodings of musical features to a display control module 104. Display control module 104 is capable of determining, based on the input musical features, the patterns, movements, colors, saturation, brightness, and other visual changes, for example. These patterns determined in by direct mapping to of musical features to features of predetermined visual patterns, or by neural networks that are trained to produce such mappings. Visual displays are controlled by a master clock, internal to the display controller, so that control signals synchronized and coordinated in a predictive fashion in real time with the music that is being heard. Signals from the music analysis module reset the display clock from time to time based on the musical rhythms and rhythm structures. Control signals are sent to the visual display in real-time so that visual sensations are synchronized and coordinated with the music that is being heard.

What is claimed is:

1. A controller for real-time visual display of music comprising:
   a music analysis module for receiving an audio input, determining a perceived structure, an affect and an emotion as a function of the audio input, and outputting a signal corresponding to the determined human perceived structure, affect and emotion; and
   a display control module operatively coupled to the music analysis module, receiving the signal and controlling a visual display as a function thereof to express the determined structure, affect and emotion in a visual manner, the music analysis module including at least one of a neural network, simulations of individual neurons or small neural populations, nonlinear oscillators, hidden Markov Models, pattern matching algorithms and statistical analyses, wherein the neural network performs nonlinear filtering of the audio input, and as a function thereof determines a simulation of a human auditory periphery; the human auditory periphery including the middle ear, cochlea, and auditory nerve.

2. A controller for real-time visual display of music comprising:
   a music analysis module for receiving an audio input, determining a perceived structure, an affect and an emotion as a function of the audio input, and outputting a signal corresponding to the determined human perceived structure, affect and emotion; and
   a display control module operatively coupled to the music analysis module, receiving the signal and controlling a visual display as a function thereof to express the determined structure, affect and emotion in a visual manner, the music analysis module including at least one of a neural network, simulations of individual neurons or small neural populations, nonlinear oscillators, hidden Markov Models, pattern matching algorithms and statistical analyses, wherein the neural network performs structural analysis of the audio input, and as a function thereof determines a simulation of a subcortical auditory system including at least one of the cochlear nucleus, lateral lemniscus, and inferior colliculus.

3. A controller for real-time visual display of music comprising:
   a music analysis module for receiving an audio input, determining a perceived structure, an affect and an emotion as a function of the audio input, and outputting a signal corresponding to the determined human perceived structure, affect and emotion; and
   a display control module operatively coupled to the music analysis module, receiving the signal and controlling a visual display as a function thereof to express the determined structure, affect and emotion in a visual manner, the music analysis module including at least one of a neural network, simulations of individual neurons or small neural populations, nonlinear oscillators, hidden Markov Models, pattern matching algorithms and statistical analyses, wherein the neural network performs structural analysis of the audio input, and as a function thereof determines a simulation of one or more cortical neural networks.

4. A controller for real-time visual display of music comprising:
   a music analysis module for receiving an audio input, determining a perceived structure, an affect and an emotion as a function of the audio input, and outputting a signal corresponding to the determined human perceived structure, affect and emotion; and
   a display control module operatively coupled to the music analysis module, receiving the signal and controlling a visual display as a function thereof to express the determined structure, affect and emotion in a visual manner, the music analysis module including at least one of a neural network, simulations of individual neurons or small neural populations, nonlinear oscillators, hidden Markov Models, pattern matching algorithms and statistical analyses, wherein the neural network performs nonlinear filtering of the audio input to determine a structure of the audio input; the structure including a tonal, timbral, rhythmic or structural feature, and outputting a simulation signal to simulate processing of the audio input by the human auditory periphery.

5. A controller for real-time visual display of music comprising:
   a music analysis module for receiving an audio input, determining a perceived structure, an affect and an emotion as a function of the audio input, and outputting a signal corresponding to the determined human perceived structure, affect and emotion; and
   a display control module operatively coupled to the music analysis module, receiving the signal and controlling a visual display as a function thereof to express the determined structure, affect and emotion in a visual manner, the music analysis module including at least one of a neural network, simulations of individual neurons or small neural populations, nonlinear oscillators, hidden Markov Models, pattern matching algorithms and statistical analyses, wherein the music analysis module performs nonlinear filtering of the audio input and wherein the music analysis module performs perceptual analysis of the audio input to determine a structure of the audio input, the structure including at least one of tonal, timbral, rhythmic or structural features, and outputting a simulation signal to simulate processing of the audio input by at least one of the human auditory periphery, a subcortical auditory network, and a cortical neural network.

6. The controller for real-time visual display of music of claim 5, wherein the musical analysis module includes at least one of a neural network, simulations of individual neurons or small neural populations, nonlinear oscillators, hidden Markov Models, pattern matching algorithms and statistical analyses to reproduce mapping of the musical structure output to an experienced affect and emotion to produce an affect and emotions output.

7. The controller for real-time visual display of music of claim 6, wherein the signal, received by the display control includes the affect and emotions output.

* * * * *